`United States Patent` [19]

Ohkawa et al.

[11] 4,145,250

[45] Mar. 20, 1979

[54] IN SITU REGENERATION OF THE FIRST WALL OF A DEUTERIUM-TRITIUM FUSION DEVICE

[75] Inventors: Tihiro Ohkawa, La Jolla; Jack Chin, San Diego, both of Calif.

[73] Assignee: General Atomic Company, San Diego, Calif.

[21] Appl. No.: 661,700

[22] Filed: Feb. 26, 1976

[51] Int. Cl.$^2$ .......................... G21B 1/00; H01J 9/395
[52] U.S. Cl. .......................... 176/3; 316/14; 427/50; 427/249
[58] Field of Search .......... 427/49, 50, 248 A, 248 R, 427/249, 255; 315/111.7, 359, 358; 316/3, 11, 14, 16; 423/453, 454, 458, 346, 409, 412; 176/3, 5, 9, 1, 2, 88, 4, 7, 92 R

[56] References Cited

U.S. PATENT DOCUMENTS

| | | | |
|---|---|---|---|
| 3,089,831 | 5/1963 | Kolb | 176/1 |
| 3,090,737 | 5/1963 | Swartz | 176/2 |
| 3,138,434 | 6/1964 | Diefendorf | 427/50 |
| 3,485,716 | 12/1969 | Bodner | 315/111.7 |
| 3,663,361 | 5/1972 | Yoshikawa | 315/111.7 |
| 3,676,179 | 7/1972 | Bokros | 427/249 |
| 3,682,775 | 8/1972 | Grosse | 176/92 R |
| 3,692,566 | 9/1972 | Branovich | 427/248 B |
| 3,949,106 | 4/1976 | Araki | 427/249 |

OTHER PUBLICATIONS

Glasstone, et al., "Controlled Thermonuclear Reactions", Van Nostrand 1960, pp. 476–477, 318–320.
Stacey, et al.; "A Tokamak Experimental Power Reactor"; Nuclear Technology, vol. 30, Sep. 76, pp. 261–298.
Lurio, et al.; IBM Technical Disclosure Bulletin, vol. 18, No. 6, Nov. 1975.
Cuomo, et al.; IBM Technical Disclosure Bulletin, vol. 18, No. 6, Nov. 1975.

*Primary Examiner*—Samuel W. Engle
*Assistant Examiner*—Donald P. Walsh
*Attorney, Agent, or Firm*—Fitch, Even, Tabin & Luedeka

[57] ABSTRACT

The first wall of a deuterium-tritium fusion reactor is regenerated in situ. The first wall substantially surrounds an enclosed reaction region confined within the reaction chamber of the reactor. To regenerate a worn first wall without opening the reactor chamber, a gaseous substance is introduced into the chamber, at least a portion of the gaseous substance comprising material, such as low Z refractory material, suitable for forming the first wall. At least a portion of this material is deposited, as by pyrolysis, in solid form on the first wall to regenerate the first wall, and residual gas is removed from the chamber. The chamber is then recharged with a mixture of deuterium and tritium. All the while the inflow of contaminants into the chamber is substantially excluded. Preferably, the pyrolysis of the gaseous substance is effected by energizing the coils used in the operation of the reactor for producing a plasma of deuterium and tritium ions in the reaction chamber.

13 Claims, 1 Drawing Figure

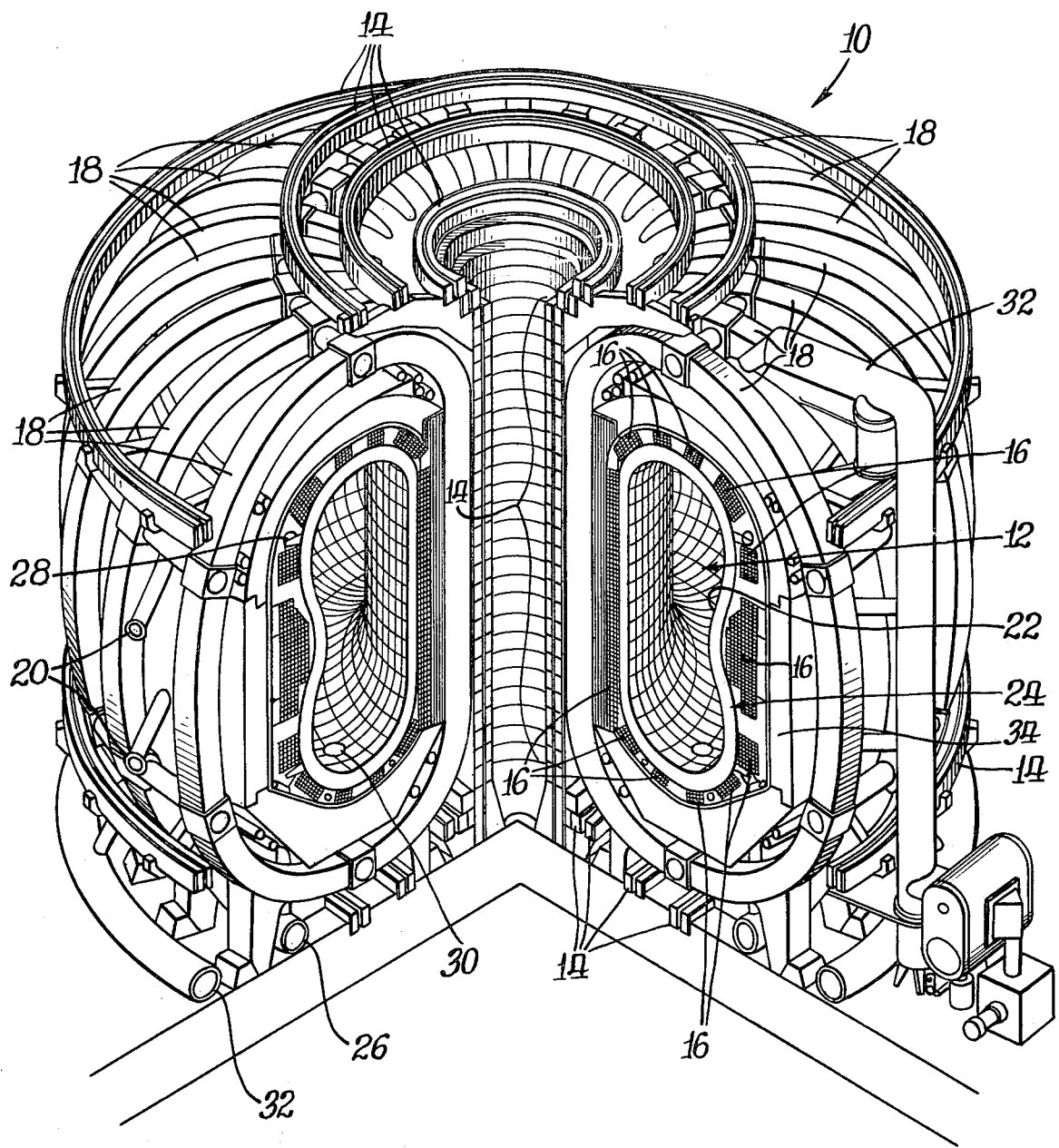

IN SITU REGENERATION OF THE FIRST WALL OF A DEUTERIUM-TRITIUM FUSION DEVICE

This invention relates to a process for regenerating a fusion first wall and more particularly to a process for in situ coating of a fusion first wall with fusion first wall materials such as pyrocarbon, silicon nitride, silicon carbide, boron nitride, siliconized carbon, silicon-aluminum nitride, aluminum oxide, quartz and other similar refractory materials.

The central plasma region of a deuterium-tritium (D-T) fusion reactor releases energy in the form of high energy neutrons, Bremsstrahlung x-rays, infrared radiation, neutral and charged particles. The fusion first wall is the first material barrier to this released energy. As such, it must have specialized properties such as (1) resistance to degradation in a fast neutron environment, (2) resistance to sputtering from high energy particle impingement, (3) resistance to spalling due to ion implantation, (4) resistance to thermal degradation, and (5) resistance to x-ray and infrared radiation damage.

The first wall must not release any substantial amounts of materials which will cause excessive energy losses in the plasma; it must allow passage of neutrons to the blanket behind the first wall; and it must have a sufficiently long useful reactor life to make the fusion reactor economically practical. This last feature, a fusion first wall concept which will ensure a sufficiently long useful reactor life, is an object of the present invention.

All materials in a D-T fusion reactor first wall environment will undergo erosion. Reactor designs to date propose two methods of overcoming this problem. One method is to decrease the rate of material erosion through basic material modifications and mechanical design modifications. The second is mechanical replacement of the first wall after excessive surface erosion has occurred. The present invention is directed to a nonmechanical method for remote replacement of the first wall, thus eliminating expensive and, in most cases, impractical mechanical replacement of the first wall.

The regenerating fusion first wall is one in which the first wall surface is replaced by a vapor deposition process. This deposition process may be a chemical or physical one in which the vacuum chamber of the D-T fusion reactor acts as the deposition chamber. Chemical vapor deposition which results in a deposit and non-corrosive gaseous products is the preferred process. An example of one such process is the thermal degradation of hydrocarbons such as $CH_4$, $C_3H_8$, $C_3H_6$, and $C_2H_6$ to produce pyrocarbon and hydrogen. Another example is $Si_3N_4$ deposition according to the reaction

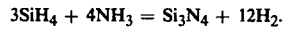

$$3SiH_4 + 4NH_3 = Si_3N_4 + 12H_2.$$

A unique feature of the method for regenerating the first wall is the use of the fusion reactor system itself to generate temperatures required for the chemical vapor deposition processes. Using the fusion reactor system to heat the first wall, preferentially heats the first wall surface where the highest erosion has occurred. This may be accomplished by producing a discharge in the chamber and allowing the gas to heat the wall. Since coating rate is generally proportional to coating temperature, the in situ deposited coating should be mainly on the eroded first wall surface.

A preferred form of the invention has been particularly designed for use in a toroidal fusion reactor wherein a mixture of deuterium and tritium is confined in a toroidal reaction chamber under low pressure. The gas mixture is ionized and heated to produce a plasma by operation of a poloidal magnetic field generated and controlled by two independent coil systems, an electric field coil system (E-coils) and a field shaping coil system (F-coils). The electric field induced by the E-coils initiates and maintains a toroidal discharge current for plasma confinement and ohmic heating. The F-coils control the magnetic configuration of the discharge, that is, the plasma shape and position. At the same time, a toroidal coil system (B-coils) produces a toroidal field establishing the azimuthal magnetic field required for stable plasma confinement.

The toroidal fusion reaction region is surrounded by a blanket where the energy of the neutrons produced in the plasma is converted to useful thermal energy, which is then extracted from the reactor. Inside the blanket is a liner substantially surrounding the reaction region, the interior surface of the liner comprising the so-called "first wall" of the reactor. For reasons given above, preferred materials for the first wall of fusion reactors are low Z refractory materials, examples of which are: carbon, siliconized carbon, SiC, $Si_3N_4$, $SiC \cdot Si_3N_4$, B, BN, Si, sialons, $(Si, Al)N$, $Si_2ON_2$, AlN, lithium sialons, $Al_2O_3$, and $SiO_2$. The regeneration process is, of course, not limited to low Z refractory materials.

During the course of the operation of the fusion reactor, the first wall deteriorates for the reasons given above, being exposed to high temperatures and high energy radiation. In accordance with the present invention, the first wall is regenerated by a vapor deposition process. A gaseous substance is introduced into the reaction chamber, at least a portion of the gaseous substance comprising material suitable for forming the first wall. This material is then deposited in solid form on the first wall, and residual gas is removed from the chamber. The chamber is then recharged with its mixture of deuterium and tritium. The process is performed in a closed system, whereby contaminants are excluded. As it is not necessary to open the system during the regeneration process, contaminating materials are not deposited on or in the first wall during the regeneration process. The gaseous substance is preferably a gas that is pyrolyzable or reacts to form a low Z refractory material of the sort mentioned above as suitable for forming the first wall. The deposit of the material is then achieved by heating the gas within the chamber to a temperature sufficient to cause it to decompose or react. In the preferred form of the invention, the gas is heated by energizing the electrical system of the reactor to heat the gas and the first wall to suitable temperatures, and more particularly, by energizing the E-coils which provide the ohmic heating of the gas.

Therefore, it is an object of the invention to provide a method for regenerating in situ a first wall of a fusion reactor. It is a further object of the invention to regenerate the first wall by depositing suitable material on the first wall while precluding the inflow of contaminants into the reactor chamber. It is a further object of the invention to provide such deposition by pyrolyzing or reacting the gas to form a suitable low Z refractory material. Still another object of the invention is to produce such pyrolyzing or reaction by operation of the electrical system of the reactor itself.

Other objects and advantages of the present invention will become more apparent from the following detailed description, particularly when taken in connection with the appended drawing in which:

The single FIGURE is an isometric view of a typical toroidal fusion device in which the present invention may be utilized, with a section cut away to illustrate the internal construction of the device.

The drawing illustrates a toroidal fusion reactor 10 for producing high energy neutrons by nuclear reaction occasioned by the fusion of deuterium and tritium nuclei. The reaction occurs in a large toroidal reaction chamber 12 containing a mixture of deuterium and tritium. The reaction chamber 12 may be more than 6 meters high, with a shape and other relative dimensions as shown in the drawing. The reaction is made to occur by creating a plasma of deuterium and tritium ions in the toroidal reaction chamber 12. The plasma is created by a poloidal field, established by E-coils 14. When the E-coils are energized, they produce a time varying magnetic flux linking the chamber 12. The electric field induced by this flux variation initiates and maintains the toroidal discharge current required for plasma confinement and ohmic heating. F-coils 16 control the magnetic configuration of the discharge, confining it generally to the shape, position and dimensions of the chamber 12. The F-coil system establishes the magnetic boundary conditions for the plasma. It is essentially a passive system with energy being added to overcome resistive losses in the F-coils. Around the chamber 12 are toroidal B-coils 18, which establish an azimuthal magnetic field for stable plasma confinement.

To achieve the required plasma temperature, auxiliary neutral beam heating is provided in addition to the ohmic heating provided by the E-coils 14. To this end, high energy neutral particles of deuterium and tritium are injected tangentially into the chamber 12 through injection ports 20. The operation of the described coils, together with the neutral beam heating, produces a plasma of deuterium and tritium ions magnetically confined in the chamber 12. The magnetic confinement maintains the plasma sufficiently out of contact with the first wall 22 forming the inner wall of the chamber 12 so that the plasma is not cooled to destruction by the first wall 22.

At the high temperatures thus produced in the reaction region containing the plasma, the deuterium and tritium nuclei undergo fusion, producing helium nuclei and high energy neutrons. These neutrons at energies of about 14 Mev penetrate the first wall 22 and pass into a blanket 24 surrounding the chamber 12. The blanket 24, formed in part of carbon and lithium, is used for extracting the energy from the neutrons, raising the temperature of the blanket 24. Helium gas is circulated through the blanket 24 from a conduit 26. Cool helium is introduced into the conduit 26, the heated helium is withdrawn from a conduit 28. The helium provides a safe, yet effective, heat transfer function, carrying heat from the reactor to an external heat exchanger, where it may perform useful work as in the production of electric energy, thereby being cooled for recirculation through the conduit 26.

It is necessary that the reaction occur at relatively low pressures. Hence, the chamber 12 is constantly pumped out by vacuum pumps through ports 30 and conduits 32.

A radiation shield 34 limits the escape of harmful radiation.

In the course of operation of a D-T fusion reactor like the one illustrated, the first wall becomes eroded. To avoid the problems of contamination and effort in disassembling and reassembling the reactor, the method of the present invention provides for the in situ regeneration of the first wall. In accordance with the present invention, a gas is introduced through the injection ports 20, which gas, at least in part, is formed of material suitable for forming the first wall. In a preferred form of the invention, this gas is pyrolyzed to release such material or reacts with another gas component to form the material. The gas is preferably activated by operation of the E-coils 14 of the reactor system. The application of suitable AC voltage to the E-coils 14 from its energizing power supply will start and maintain an electrical discharge through the gas in the chamber 12. The gas particles, as well as radiation from the discharge will heat the first wall. The ionization of the gas and temperature of the wall can be controlled by controlling the current in the E-coils 14. The gas and wall are thereby heated to temperatures sufficient to pyrolyze or react the gas in the chamber 12 to form the first wall material from the gas and deposit it on the first wall, thus regenerating the first wall. Excess gas and reaction products are withdrawn through the ports 30 and conduits 32. The chamber 12 may then be recharged with deuterium and tritium for further fusion reaction.

The invention may be carried out with a large number of different gases and at different temperatures and pressures, depending upon the particular coating desired. The following three examples are therefore illustrative only.

EXAMPLE 1

In a pyrocarbon first wall regeneration process using methane, methane is caused to flow into the chamber 12 at a pressure of 400 torr at a flow rate of 10 cm$^3$/min per cm$^2$ of substrate, and is pyrolyzed at a coating temperature of 1500° C.

EXAMPLE 2

In a pyrocarbon first wall regeneration process using propylene, a mixture of 80% $C_3H_6$ and 20% He is caused to flow into the chamber 12 at a pressure of 200 torr at a flow rate of 5 cm$^3$/min per cm$^2$ of substrate, and is pyrolyzed at a coating temperature of 1300° C.

EXAMPLE 3

In a first wall regeneration process depositing $Si_3N_4$, a gas mixture containing 0.2% $SiH_4$, 25.8% $NH_3$, 19% $H_2$, and 55% He is introduced into the chamber 12 at a pressure of 200 torr at a gas flow rate of 20 cm$^3$/min per cm$^2$ of substrate and reacted at a temperature of 1150° C. to produce the coating of $Si_3N_4$.

Deposition may be effected at any of a number of coating rates, typical rates being 0.6 to 90 mils/hour.

Various other well known reactions may be carried out to provide deposition of suitable refractory materials on the first wall 22. It is also possible to perform physical as well as chemical vaporization in the first wall deposition. Thus, sputtering, evaporation and other similar processes may be employed separately or in combination with chemical vapor deposition processes to deposit almost any material desired.

Various other alternatives may be utilized within the scope of the present invention.

What is claimed is:

1. A method for regenerating the first wall of a deuterium-tritium fusion device wherein the first wall substantially surrounds an enclosed reaction region confined within a reaction chamber, said method comprising introducing gas into said chamber, at least a portion of said gas comprising material suitable for forming said first wall, depositing at least a portion of said material in solid form on said first wall, removing residual gas from said chamber, and charging said chamber with a mixture of deuterium and tritium, all the while substantially precluding the inflow of contaminants into said chamber.

2. A method for regenerating the first wall of a fusion device wherein the first wall substantially surrounds an enclosed reaction region confined within a reaction chamber, said method comprising introducing into said chamber gas forming upon application of heat a low Z refractory material suitable for forming said first wall, and heating said gas within said chamber to a temperature at which it forms said material and deposits it in solid form upon said first wall.

3. The method according to claim 2 wherein said gas is heated by energization of the electrical coil system utilized in the operation of the reactor to produce a plasma in the reaction chamber.

4. A method for regenerating the first wall of a fusion device wherein the first wall substantially surrounds an enclosed reaction region confined within a reaction chamber, said method comprising introducing into said chamber a gas pyrolyzable to form a low Z refractory material suitable for forming said first wall, and heating said gas within said chamber to a temperature at which it decomposes to form said material and deposit it in solid form upon said first wall.

5. The method according to claim 4 wherein said low Z refractory material comprises carbon.

6. The method according to claim 5 wherein said gas comprises hydrocarbon molecules.

7. The method according to claim 4 wherein said gas is heated by energization of the electrical coil system utilized in the operation of the reactor to produce a plasma in the reaction chamber.

8. A method for regenerating the first wall of a fusion device wherein the first wall substantially surrounds an enclosed reaction region confined within a reaction chamber, said method comprising introducing into said chamber a gas mixture reacting upon application of heat to form a low Z refractory material suitable for forming said first wall, and heating said gas mixture within said chamber to a temperature at which it reacts to form said material and deposit it in solid form upon said first wall.

9. The method according to claim 8 wherein said low Z refractory material is selected from the group consisting of $Si_3N_4$, SiC, AlN, $SiC.Si_3N_4$, BN, Si, siliconized carbon (Si, Al)N, $Al_2O_3$ and $SiO_2$.

10. The method according to claim 8 wherein said gas mixture is heated by energization of the electrical coil system utilized in the operation of the reactor to produce a plasma in the reaction chamber.

11. A method for regenerating the first wall of a fusion device having an electric coil system for producing an electrical discharge in reaction gas confined within a reaction chamber and heating the reaction gas to produce fusion reactions within a limited enclosed region of the confined gas substantially surrounded by the first wall, said method comprising introducing into said chamber gas forming upon application of heat a material suitable for forming said first wall, energizing said electric coil system of the reactor to heat said gas and said first wall to temperatures at which said gas forms said material and deposits said material in solid form upon said first wall.

12. A method for regenerating the first wall of a fusion device having an electrical system for producing an electrical discharge in reaction gas confined within a reaction chamber and heating the reaction gas to produce fusion reactions within a limited enclosed region of the confined gas substantially surrounded by the first wall, said method comprising introducing into said chamber a gas pyrolyzable to form a material suitable for forming said first wall, operating said electrical system of the reactor to heat said pyrolyzable gas and said first wall to temperatures at which said pyrolyzable gas decomposes to form said material and deposit said material in solid form upon said first wall.

13. A method for regenerating the first wall of a fusion device having an electrical system for producing an electrical discharge in reaction gas confined within a reaction chamber and heating the reaction gas to produce fusion reactions within a limited enclosed region of the confined gas substantially surrounded by the first wall, said method comprising introducing into said chamber a gas mixture reacting upon application of heat to form a material suitable for forming said first wall, operating said electrical system of the reactor to heat said gas mixture and said first wall to temperatures at which said gas reacts to form said material and deposit said material in solid form upon said first wall.

* * * * *